(12) United States Patent
Zhang et al.

(10) Patent No.: US 8,983,142 B1
(45) Date of Patent: Mar. 17, 2015

(54) PROGRAMMATIC SILHOUETTE ATTRIBUTE DETERMINATION

(75) Inventors: Wei Zhang, Fremont, CA (US); Emilio Rodriguez Antunez, III, Mountain View, CA (US); Salih Burak Gokturk, Palo Alto, CA (US); Baris Sumengen, New York, NY (US)

(73) Assignee: Google Inc., Mountain View, CA (US)

( * ) Notice: Subject to any disclaimer, the term of this patent is extended or adjusted under 35 U.S.C. 154(b) by 525 days.

(21) Appl. No.: 13/294,158

(22) Filed: Nov. 10, 2011

Related U.S. Application Data

(60) Provisional application No. 61/456,695, filed on Nov. 10, 2010.

(51) Int. Cl.
*G06K 9/00* (2006.01)

(52) U.S. Cl.
USPC .......................................... 382/111; 382/195

(58) Field of Classification Search
CPC ...................... G06T 2207/30124; G06Q 30/00; G06Q 30/0601
USPC ................................................. 382/111, 195
See application file for complete search history.

(56) References Cited

U.S. PATENT DOCUMENTS

| | | | |
|---|---|---|---|
| 6,624,843 B2 | 9/2003 | Lennon | |
| 7,542,610 B2 | 6/2009 | Gokturk et al. | |
| 7,657,100 B2 | 2/2010 | Gokturk et al. | |
| 8,412,594 B2 * | 4/2013 | Kundu | 705/27.1 |
| 8,626,687 B2 * | 1/2014 | Perrotton et al. | 706/25 |
| 2006/0251339 A1 | 11/2006 | Gokturk et al. | |
| 2007/0258645 A1 | 11/2007 | Gokturk et al. | |
| 2008/0082426 A1 | 4/2008 | Gokturk et al. | |
| 2009/0091798 A1 | 4/2009 | Lawther et al. | |
| 2009/0116698 A1 | 5/2009 | Zhang et al. | |
| 2009/0185723 A1 | 7/2009 | Kurtz et al. | |
| 2011/0238536 A1 * | 9/2011 | Liu et al. | 705/27.2 |

OTHER PUBLICATIONS

Ahuja and Veenstra, "Generating Octrees from Object Silhouettes in Orthographic Views," IEEE Transactions on Pattern Analysis and Machine Intelligence, 11(2):137-149, Feb. 1989.
Bottino and Laurentini, "Introducing a New Problem: Shape-from-Silhouette when the Relative Positions of the Viewpoints is Unknown," IEEE Transactions on Pattern Analysis and Machine Intelligence, 25(11):1484-1493, Oct. 2003.
Bottino and Laurentini, "The Visual Hull of Smooth Curved Objects," IEEE Transactions on Pattern Analysis and Machine Intelligence, 26(12):1622-1632, Dec. 2004.
Boulay et al., "Applying 3D human model in a posture recognition system," Pattern Recognition Letters, 27(15):1788-1796, Nov. 2006.
Boyer and Berger, "3D Surface Reconstruction Using Occluding Contours," International Journal of Computer Vision, 22(3):219-233, Mar. 1997.

* cited by examiner

*Primary Examiner* — Shefali Goradia
(74) *Attorney, Agent, or Firm* — Fish & Richardson P.C.

(57) ABSTRACT

A set of silhouette attributes are determined for a class of objects, where each of the silhouette attribute corresponds to a discriminative feature that is not associated with any other silhouette attribute in the set. An image content item depicting an object of the class is analyzed. A discriminative feature is identified for the object. The silhouette attribute associated with the determined discriminative feature is associated with the object as provided in the image content item.

19 Claims, 6 Drawing Sheets

Title: Silver Platform Pump
Description: Pair this gorgeous pair of platform pumps with your sexiest LBD and you'll be guaranteed to have all eyes on you. With a silver leather upper, a sleek open toe and a classy slingback strap, these platform pumps are a must-have for all your special occasions.

Title: Silver Platform Pump
Description: Pair this gorgeous pair of platform pumps with your sexiest LBD and you'll be guaranteed to have all eyes on you. With a silver leather upper, a sleek open toe and a classy slingback strap, these platform pumps are a must-have for all your special occasions.

PROGRAMMATIC SILHOUETTE ATTRIBUTE DETERMINATION

RELATED APPLICATIONS

This application claims benefit of priority to Provisional U.S. Application No. 61/456,695, filed Nov. 10, 2010; the aforementioned priority application being hereby incorporated by reference in its entirety.

TECHNICAL FIELD

The claimed embodiments relate to a system and method for determining a silhouette attribute of an object depicted in an image content item.

BACKGROUND

Some attempts have been made as to automated apparel silhouette recognition. Past approaches have included attempts at a simple clothing searching method that extracts shape context features on segmentation boundary points to recognize a few salient clothing silhouette attributes, such as sleeveless, v-neck and so on. Despite the closeness of the targeting problem, the past approaches did not perform well. Additionally, learning based clothing attribute recognition methods were proposed as part of a multimedia fitting mirror system. In these approaches, various specific image features, including skin area, the distribution of Harris corner points and Canny edge points, were extracted and fed into Support Vector Machines to learn attribute classifiers. Harris corner points refer to a technique that identifies specific regions of an image where the brightness of an image is deemed to shift dramatically along X and Y axes. Canny edge points refers to a technique that uses a brightness gradient to detect an edge within an image. The proposed methods were reported to exhibit 75%-90% accuracy in test environments as to recognizing features such as sleeve length, collar existence, placket length. Another branch of related work is automatic attribute discovery, which are focused on identifying potential attribute phrases that can be consistently described by some aspect of an object's visual appearance. A previous approach discovered attributes such as "front platform", "high heel", "clogs" in approximately 37795 images collected from a shopping website. The approach also categorized attributes according to their localizability and visual feature type.

DETAILED DESCRIPTION

Figure 1:
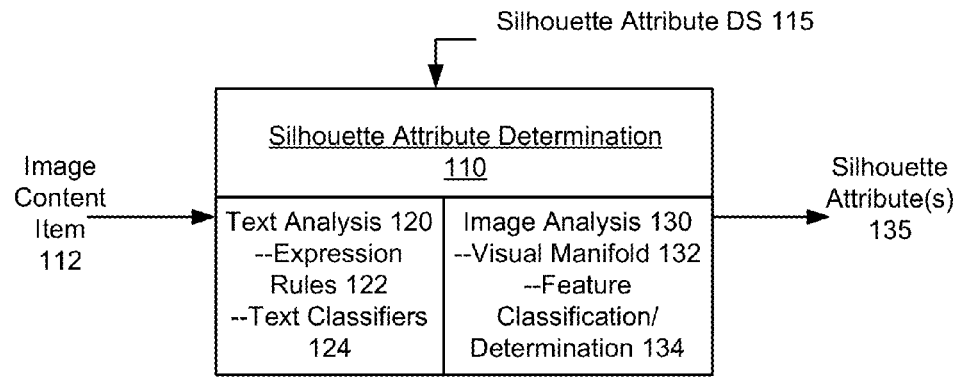
FIG. 1 illustrates a silhouette attribute determination (SAD) component, according to one or more embodiments.

Embodiments described herein include a system and computer implemented method for analyzing image content items to determine silhouette attributes of depicted objects, including merchandise objects such as clothing or apparel. In an embodiment, at least one of a text or image portion of an image content item is analyzed in order to determine a silhouette attribute of an object depicted in an image content item.

According to some embodiments, a set of silhouette attributes are determined for a class of objects, where each of the silhouette attributes corresponds to a discriminative feature that is not associated with any other silhouette attribute in the set. An image content item depicting an object of the class is analyzed to determine whether any of the discriminative features can be identified for the object. The silhouette attribute associated with the determined discriminative feature is associated with the object as provided in the image content item.

Embodiments described herein recognize that silhouette components of objects can map to one of a handful of known, mutually-exclusive types, termed silhouette attributes. For example, a majority of shoes can be associated with a silhouette attribute that is based on the shoe's toe type, such as a round toe, pointy toe, square toe, or open/peep toe. Accordingly, embodiments include a computer system and method in which silhouette attributes are determined for objects of a particular class.

Furthermore, embodiments recognize that silhouette attributes can correlate to a small, efficient vocabulary that people use in discussing or thinking about apparel. In this regard, the silhouette attribute of an item of clothing or apparel can enhance or augment, for example, search functionality for such clothing or apparel. For example, a user can specify a search term that corresponds to, or is based on, a silhouette attribute. As another example, a recommendation engine can use the silhouette attribute of, for example, an item of clothing in order to categorize the item of clothing, determine the relevance of the item of clothing with other items of clothing, or determine similarity between items of clothing sharing the same silhouette attribute. According to embodiments, silhouette attributes can be programmatically determined for a variety of other uses as well.

In comparison, conventional approaches that require manual labeling of silhouette attributes are impractical for all but the smallest apparel databases. A realistic database covering a current inventory of multiple merchants can encompass millions of garments. Furthermore, inventory can vary dramatically with time, as inventory changes with the seasons and has very little overlap from year to year. Accordingly, embodiments recognize that silhouette attributes are more practical in application if the attributes can be programmatically identified from images of objects, such as clothing and apparel. Accordingly, some embodiments described herein provide for identifying silhouette attributes for content items relating to clothing or apparel, such as women's dresses, women's tops, including shirts, blouses, tanks etc, and women's shoes.

With regard to apparel or clothing, for example, there is often a set of structural components that is required for the garment to remain functional. For example, dresses typically require a neckline, and shoes require a toe. Though a great deal of artistry goes into making these silhouette components varied and unique, their implementations satisfy constraints imposed for human comfort, social context, and adherence to modern fashion. The classes of apparel may be defined in part by structural components. Within classes of apparel or clothing, e.g., women's shoes, intra-class variations may be categorized by silhouette type, where each silhouette type is associated with a feature that is mutually exclusive or discriminative to that type.

With commercial implementations, objects, such as items of clothing or apparel, are assigned attributes drawn from a pool of attributes, e.g., 49, in multiple categories e.g., 9, using at least one image of a product, or alternatively only one image, together with the title and description text typically provided by online retailers. According to an embodiment, silhouette attribute determination is performed automatically to assign an item of clothing or apparel to one of the silhouette attributes associated with a category of clothing or apparel. For example, in the product class of women's shoes, silhouette attributes can include a stacked heel, a high heel, an open toe, or an ankle strap.

Embodiments further recognize that the visual and textual information provided with individual product content items are generally sufficiently complete for a human to determine a silhouette attribute of a product, albeit with occasional ambiguity as to which silhouette attribute is most applicable. Yet, the form of product content items can present many challenges for computer-implemented analysis. Among the challenges, apparel/clothing images can exhibit large variations in model pose, scale, and lighting. It is very common to observe self-occlusion, folding, and shading in the images. Although image backgrounds are typically clean, uncluttered backgrounds cannot generally be assumed. In addition, there are higher-level "semantic gap" challenges in mapping between textual terms and machine-perceivable image features. For example, it is not intuitively clear which image features are relevant to the definition of "halter dresses" or "Mary-Jane shoes", and even localizing relevant image features is a nontrivial task.

Further in the context of image content items relating to merchandise such as clothing or apparel, the textual information provided in the image content items can be unreliable. In such content items, the accompanying text may be too short to provide any information for analysis. Additionally, most, and sometimes all, of the words in the text of such content items are irrelevant to silhouette attributes. Also, the image content items come from different retailers, so there exists the potential for inconsistent use of silhouette nomenclature. For example, a maxi dress may be described as "long dress" by one retailer but as "55 inches dress" by another retailer.

Terminology

As used herein, the term "image data" is intended to mean data that corresponds to or is based on discrete portions of a captured image. For example, with digital images, such as those provided in a Joint Photographic Experts Group (JPEG) format, the image data may correspond to data or information about pixels that form the image, or data or information determined from pixels of the image. Another example of "image data" is signature or other non-textual data that represents a classification or identity of an object, as well as a global or local feature.

The terms "recognize", or "recognition", or variants thereof, in the context of an image or image data, e.g., "recognize an image," means a determination as to what the image correlates to, represents, identifies, means, and/or a context provided by the image. Recognition does not necessarily mean a determination of identity, such as a name, unless stated so expressly.

A "mask" refers to a derived image that depicts an object of interest separate from a remainder or background of the image. Generally, a mask is determined by associating each pixel of an image with a binary value that represents either the object of interest or the background.

As used herein, the terms "programmatic", "programmatically" or variations thereof mean by way of execution of code, programming or other logic. A programmatic action may be performed with software, firmware or hardware, and generally without user-intervention, albeit not necessarily automatically, as the action may be manually triggered or require manual interaction.

One or more embodiments described herein may be implemented using programmatic elements, often referred to as modules or components, although other names may be used. Such programmatic elements may include a program, a subroutine, a portion of a program, a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system provided for in this application may require use of memory, processors and network resources, including data ports and signal lines, unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular telephony/messaging devices, tablets or laptop computers. Thus, memory, processing and network resources may all be used in connection with the establishment, use or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include a processor, or processors, and various forms of memory for holding data and instructions. Examples of computer-readable mediums include permanent memory storage devices, such as hard drives on personal computers or servers. Other examples of computer storage mediums include portable storage units, such as CD or DVD units, flash memory, such as carried on many cell phones and portable devices, and magnetic memory. Computers, terminals, network enabled devices, e.g., mobile devices such as cell phones, are all examples of machines and devices that utilize processors, memory, and instructions stored on computer-readable mediums.

System Description

FIG. 1 illustrates a silhouette attribute determination (SAD) component, according to one or more embodiments. A SAD component 110 can be used with, for example, a system that analyzes image content items, such as in e-commerce applications, as described with an embodiment of FIG. 2. The SAD component 110 can be configured for specific classes of objects, such as clothing or apparel, or more specifically, women's dresses, women's tops, and women's shoes. For classes of products, the SAD component 110 may maintain a silhouette attribute data structure 115, e.g., list form, wherein each silhouette attribute includes or corresponds to a discriminative feature that is not identified by any other silhouette attribute of that category or sub-category.

The SAD component 110 processes text or image content in order to associate a silhouette attribute 135 from the silhouette attribute data structure 115 with a particular image content item 112. In an embodiment, the SAD component 110 includes text analysis processes 120 and image analysis processes 130 that execute to determine the silhouette attribute 135 for the image content item 112. More specifically, in analyzing an image content item of a particular class, SAD component 110 utilizes processes of text analysis 120, image analysis 130, or the combination of text and image analysis, to determine the silhouette attribute 135 for the image content item 112. As described further, for the given image content item 112, the processes or sub-processes that are used may depend on the subject or content of the image content item, the class of the object depicted in the image content item, the context or environment of the object as presented in the image content item, and/or other parameters.

According to an embodiment, text analysis 120 includes a process for implementing expression rules 122, and/or a process for implementing text classifiers 124. The process for expression rules 122 assigns rules to terms and phrases that may appear in the text portion of a content item relating to a particular class of objects. In some implementations, some of the rules may designate, or conversely not designate, the silhouette attribute 135 from the silhouette attribute data structure 115. Other rules may weigh specific silhouette attributes to terms or phrases that are present in the text description, such as described by an embodiment of FIG. 3. Thus, for example, expression rules 122 can, in some cases, be determinative of a silhouette attribute for an object depicted in the image content item, while in other cases, the analysis is indicative, so as to be weighted and supplemented by results of other processes, e.g., such as for text classifier 124 or image analysis 130. Additionally, embodiments recognize that expression rules 122 can be unreliable in some cases, in which case the result of the analysis can be disregarded, and/or other processes, e.g. image analysis, may be weighted or otherwise relied on more heavily.

The silhouette attributes 135 that are determined by SAD component 110 may be predefined and identified by the silhouette attribute data structure 115. In some implementations, the silhouette attributes are manually defined by experts, based on objects of interest that are depicted in a particular content source, e.g. online product catalog. The definition may include identifying discriminative features of the silhouette of a particular category or sub-category of objects. The objects depicted in the individual content items are then matched to a predefined silhouette attribute on the silhouette attribute data structure 115.

The image analysis 130 includes image processes, including a visual manifold process 132, and one or more types of feature classification/determination processes 134. The visual manifold process 132 identifies and compares the shape of an object with other objects that have known silhouette attributes. More specifically, as described with, for example, an embodiment of FIG. 4, the visual manifold process 132 compares the shape of an object to that of other objects that have assigned attributes, and then assigns the silhouette attribute of one or more other objects that are deemed similar in shape to the object of the image content item that is being analyzed.

Figure 5:
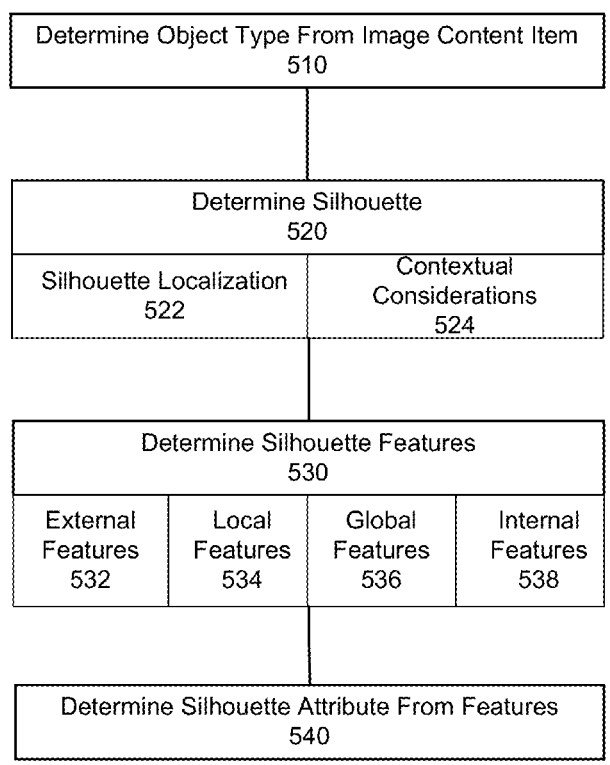
FIG. 5 illustrates feature classification methodology for performing silhouette attribute determination, according to one or more embodiments.

The SAD component 110 may also implement one or more feature classification/determination processes 134. The feature classification/determination processes 134 may operate to identify, for example, salient aspects of the object's shape for a given object class, including (i) local features, (ii) global features, (iii) external shape features, and/or (iv) internal shape features. The determined features can be mapped to a category, and/or applied against a training set for the object class, in order to determine discriminative silhouette attributes from the salient features. FIG. 5 provides more description of feature classification/determination processes 134, according to one or more embodiments.

Figure 2:
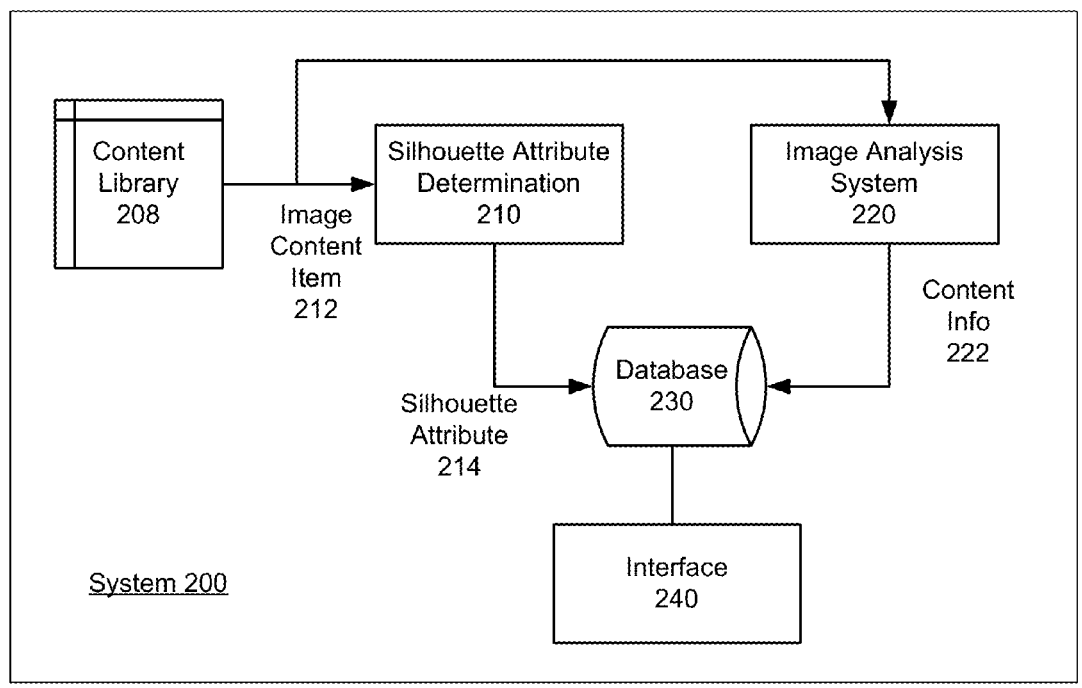
FIG. 2 illustrates a system that utilizes a silhouette attribute determination component to supplement or augment a database of information about image content items of a particular class or classes, according to one or more embodiments.

FIG. 2 illustrates a system that utilizes a SAD component to supplement or augment information pertaining to image content items that depict objects of a particular class, according to one or more embodiments. In an embodiment of FIG. 2, the SAD component 210 augments information relating to product content items, such as web resources or online catalogs that depict images of merchandise objects for sale. As an example, a system 200 such as shown by FIG. 2 may be implemented to visually characterize image content items for clothing and apparel in an e-commerce environment, e.g., product searching or comparison shopping. In an embodiment, system 200 includes SAD component 210, image analysis sub-system 220, and a product analysis database 230. The system 200 may interface or access a content library 208, or other source or aggregation of image content items, which includes a collection of image content items 212 that are to be analyzed. The collection of image content items 212 can include content items that are provided from, for example, an online catalog or aggregation of products, e.g. from a website or from multiple websites. For example, the individual image content items 212 may each depict clothing or apparel from one or more manufacturers or retailers. The individual image content item 212 are processed by SAD component 210 in order to determine a discriminative silhouette attribute 214 for the product, or object, depicted in the image content item. As mentioned with an embodiment of FIG. 1 and elsewhere in this application, the image content item 212 can be analyzed for text and visual information, based on the image portion of the image content item 212, in order to determine the discriminative silhouette attributes 214 of the product described in the image content item. Among other uses, the silhouette attribute 214 facilitates or augments categorization or classification, or sub-classification, of objects, such as clothing, apparel or other merchandise items. The silhouette attribute 214 that is determined for an object of one of the image content items can also be used to determine other categorization classifiers for that object, such as style. A process such as described can be used to determine additional classifiers for objects that are depicted in individual image content items. The determined classifiers can be associated with the corresponding image content items to augment other processes and functionality, such as searching or product-category listings.

In some embodiments, the image analysis sub-system 220 analyzes each image content item 212 for its text and image to determine additional content information 222, such as the category of the object depicted in the image content item, and visual information about the depicted products appearance, e.g., recognition information such as object signature, color, pattern, texture, features. The content information 222 may be stored in the product database 230. The content information 222 may include, for example, a feature vector for the image portion of the image content item 212.

An interface 240 may access the database 230 to use the image analysis information. The interface 240 may, for example, correspond to a programmatic or human search interface that visually matches objects, as depicted in the image input, to input query or criteria.

Figure 3:
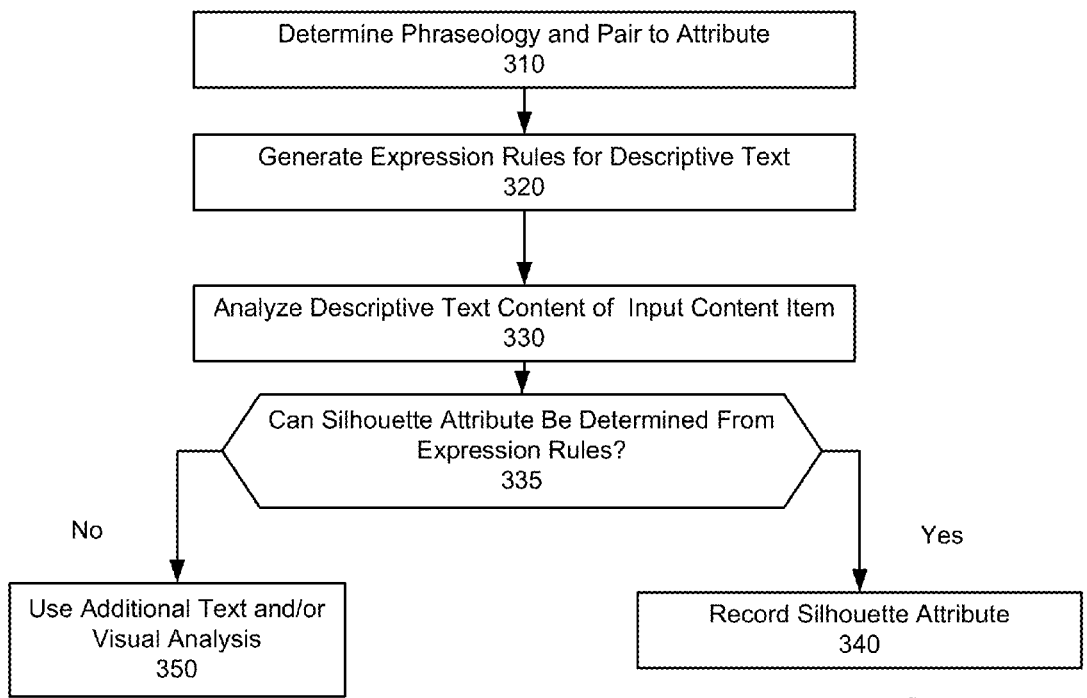
FIG. 3 illustrates a method for performing expression analysis in order to determine silhouette attributes, according to one or more embodiments.

FIG. 3 illustrates a method for performing text expression analysis in order to determine silhouette attributes, according to one or more embodiments. For a given class of objects, such as products or merchandise, an embodiment provides that an identification is made for phraseology, e.g., set of words, phrases, terms, that are in use with objects of an object class depicted in the image content items that are being analyzed. The identification of the phrases or terms can be made by experts, such as fashion experts, who can identify descriptive terms used to market products of a particular class, e.g., classes of fashion products, as well as trends which introduce or influence the use of some words or phrases in describing the product or object class. The phrases and terms may be assigned to individual silhouette attributes (310). Additionally, a set of expression rules may be generated for some or all of the determined silhouette attributes (320). Each expression rule can associate a given term or phrase with a particular silhouette attribute. The individual expression rules can be indicative or determinative of a particular silhouette attribute. The expression rules can also be generated manually by, for example, experts.

Once the phraseology and expression rules are determined, product content items can be analyzed for descriptive text content (330). From the text content, a determination is made as to whether a silhouette attribute can be determined from one of the regular expression rules (335). This determination may be performed by scanning text content of the image content item for words or phrases, and referencing words or phrases to predetermined rules, as determined in (320).

In some cases, an individual rule expression may be determinative of a corresponding silhouette attribute. For example, the presence of "V-" in the descriptive content of a shirt or blouse, which can be the product class, may be determinative that the silhouette attribute is a V-neck shirt or blouse. If such a determination can be made, the silhouette attribute is recorded for the particular content item (340). In other cases, the wording is not determinative, but can possibly influence a decision for, or against a conclusion that an object depicted in an image content item includes a particular silhouette attribute. In such cases, additional text and/or visual analysis may be performed (350). The expression rules can be weighted in combination with results of the additional text and/or visual analysis.

As mentioned with an embodiment of FIG. 1, text classifiers can be used as an alternative or additional text-based analysis mechanism, according to some embodiments. More specifically, the textual portion of a product content item may be analyzed for use with, for example, Support Vector Machine (SVM) classifiers. SVM is a well known classifier technique in the field of image processing, in which image content is analyzed to determine whether an image includes a characteristic or object of interest. An SVM is trained with examples, and the process divides its inputs into positive and negative sets based on its training examples. As applied here, experts can manually tag a training set of images, which may be preselected to be representative of a particular library or product class, for silhouette attributes. In one embodiment, a two level hierarchy is implemented in a text-based classifier. A lower-level includes multiple "bag-of-words" classifiers, each of which can be used to define a probability distribution of possible attributes for a silhouette component. The higher-level classifier takes individual probability distributions as input to an SVM and outputs to final distribution.

Embodiments recognize that the "bag-of-words" classifiers differ in their respective dictionaries and SVM types. In one implementation, two dictionary types are used for associating classifiers to silhouette attributes with an object class: a large generic dictionary that includes millions of phrases found in a given product database, and a smaller dictionary of select phrases, e.g. 500-3000 phrases, chosen for specific silhouette components. The dictionaries can be used to create binary input vectors, where values between zero or one are used depending on whether a phrase appears in a product's metadata.

Figure 4:
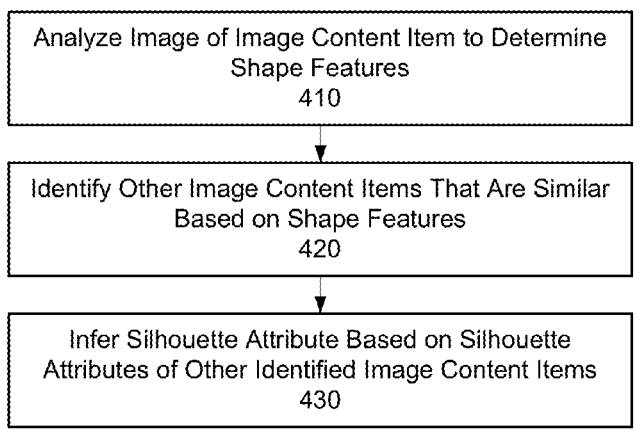
FIG. 4 illustrates a visual label propagation methodology for determining silhouette attributes of product content items, according to one or more embodiments.

As mentioned with FIG. 1 and other embodiments, image analysis processes may also be used to determine silhouette attributes of product content items. FIG. 4 illustrates a visual manifold process for determining silhouette attributes of product content items, according to one or more embodiments. An embodiment of FIG. 4 recognizes that visually similar items usually share same silhouette attributes. But embodiments recognize that such an assumption may depend on how the visual similarity is defined.

The visual similarity process may be implemented on the image of an object to determine its shape features (410). Generally, silhouettes are defined by shape rather than, for example, texture or color. Thus, the shape feature of an object may be the primary or determinative factor in the visual similarity process.

In response to performing the visual similarity process, other image content items are identified that are similar based on shaped features (420). Any shape-based feature algorithm may be used to determine such similarity determinations. In one implementation, simple global shape descriptors may be extracted from a given product content item based on the orientation of edge points in the product shape. A Euclidean distance between shaped features can provide a sufficiently effective metric to evaluate and retrieve similar items from a given collection.

Once similar items are identified for a given product content item, the silhouette attribute of the product content item under analysis is inferred based on the silhouette attributes of the similar items (430). A direct correlation may be made between the silhouette attributes of the two similar items. However, as with other techniques described, the silhouette attribute inference may correspond to a weighting parameter that influences determination of silhouette attributes, particularly when multiple algorithms for determining silhouette attributes are used. Still further, the correlation between the silhouette attributes of the two similar items—the product content item under analysis, and that retrieved from a database—may be an indirect inference. For example, products may be matched across categories, and a silhouette attribute inference may account for the difference in categories.

FIG. 5 illustrates feature classification methodology for performing silhouette attribute determination, according to one or more embodiments. As mentioned with an embodiment of FIG. 1, feature classification is another type of image analysis that can be performed in determining discriminative silhouette attributes of the product content item.

An object type is determined from a product content item (510). While multiple kinds of products or objects can be analyzed for silhouette attributes, different product classes, or objects, typically have different visual characteristics that are inherent to the medium or product of the particular class. For example, the convention for how shoes are displayed in a product content item is simpler and more predictable than the conventions for how women's dresses are depicted. In product catalogs, shoes are typically isolated from people, and are presented in one of a relatively small set of possible orientations. Dresses, on the other hand, may or may not be displayed as worn on a person or a mannequin. Sometimes, the model or mannequin wearing the dress has hair which occludes portions of the dress. There are also various pose factors which can affect how the dresses are displayed. Embodiments described herein account for the differences in conventions for presenting products of different classes, as well as other visual characteristics inherent to either the product class or the medium in which individual products are presented.

The silhouette for a particular image content item can be determined for further use. Generally, the silhouette determination process can involve segmenting an object of interest, e.g., clothing, from a remainder of an image. However, embodiments recognize that class-specific considerations may be used in order to identify silhouette for objects of a particular class. The considerations may be based on variations that are known within a particular object class, as well as variations inherent in the manner that the object of the class is displayed in image content items (520).

For some product or object classes, silhouette location detection is performed (522). Silhouette location detection recognizes that some object classes have a silhouette component that is highly localized, so that a specific portion of the particular object is highly informative for purpose of determining the silhouette attribute. Determining such localization can reduce the noise introduced by irrelevant image features. Localization may include identifying a box of interest in a larger image of a particular product, followed by extracting features mostly from the region within the identified box. The localization step may vary for different types of visual classifiers, in a way that is specific to individual silhouette category. For example, embodiments recognize that with shoes, retailers typically present them as being unworn and on bare backgrounds. When determining the silhouette attributes using visual techniques, a determination may be made for shoe orientation based on the relative heights of the left and right size of the shoe mask, as well as the distribution of edge angles in the shaped formed by the bottom of the show, referred to the convex hull. A box can then be constructed around the side of the mask where the targeted silhouette component can be expected to be present such as described with FIG. 6.

As an addition or alternative, contextual considerations may be also affect the manner in which the silhouette for an object is determined (524). For example, for dresses and tops, silhouette determination may include segmentation with additional considerations. Often, dresses and tops are pictured on a human or mannequin. Thus, isolation of clothes from the model or mannequin may be performed, but such task can be difficult if, for example, hair covers the clothing or if color of the clothes is similar to that of the model. To address these parameters, segmentation is performed using color and gradient. The expected location of the silhouette component on the foreground mask can depend on whether that foreground includes a human, mannequin, or no model at all. Thus, some embodiments provide that an initial determination is made as to a model type: present, mannequin, hair present, tone of model, and other factors. Heights at points along the top of the mask may also be sampled, normalized against image type then fed into a linear SVM classifier. If the dress or top is shown unworn, the clothes may be in a canonical position, such as laid flat, facing front, right side up. The local box for determining the silhouette component may be selected accordingly. However, if the human or mannequin model is determined to be present, an additional skin and hair segmentation step may be performed to localize the remaining features. This can be particularly significant when clothes are displayed on human models, as conventional modeling can provide for unusual viewing angles or poses.

Other considerations in the context of image content items for dresses and clothing can include the model, if any, on which the dress is worn. For example, if a dress or item of clothing is shown as being worn by a model, the presence of the model may occlude or impede the ability to determine the silhouette for the object of interest in the image content item. Skin and hair segmentation for models wearing dresses and tops may be performed via a color model that is optimized for a given image. The most likely skin and hair pixels are identified based on a skin color, local smoothness, and positions in the foreground mask. Sampling may also be performed inside the clothing mask and outside the foreground mask to represent the clothes and the background. A probability distribution technique, such as provided by a Gaussian mixture model, may be trained on red green blue (RGB) values from each of these three areas, and the resulting color models can be used to compute an initial segmentation. The resulting skin and hair components are pruned based on shape and position, and components are reshaped so that their boundaries fall near gradient edges. This new pool of skin and hair pixels is re-sampled to build a new color model. This optimization can be done for multiple iterations.

Accordingly, for image content items depicting clothing worn by models, the foreground mask and skin mask are used in combination to determine the most likely location of silhouette components that are localized, and highly predictive of the silhouette attribute.

The silhouette features may be determined from a silhouette of an object (530). The silhouette features can include identification of external features of the general shape for the object (532), including general shape features of an object. Mostly, silhouettes can be determined by shape rather than texture or color. Both external and internal shaped features can be used to enhance spatial distribution information using the spatial matching techniques.

Additionally, some silhouette types can be considered as local, in which a specific local shape pattern on a contour strongly indicates the existence of a local silhouette attribute or feature (534). For example, a dented shape shoe suggests the shoe is open toe, and a pole shape suggests high heel. In order to capture these local shape patterns a Pyramid of Histograms of Orientation Gradients (PHOG) descriptor may be implemented. In general, the PHOG descriptor is made up of multiple Histogram of Orientation Gradient (HOG) descriptors. As applied, a HOG descriptor is based on a distribution of edge directions, including vertical or horizontal or diagonal, for a given region of an image. The PHOG descriptor is made of multiple HOG descriptors that describe cells or sub-images of the image being analyzed. Specifically, the PHOG descriptor combines the HOG descriptors for the individual cells or subimages from a spatial pyramid. In this way, the PHOG descriptor of a given image is based on the HOG descriptor of the whole image and the HOG descriptor of each subimage or cell. In an embodiment, the PHOG descriptor is used to extract Local Silhouette Shape Feature F1, which is a histogram of edge orientation within the silhouette box quantized into G grid cells. But instead of computing the histogram at all edge points, only the contour points may be computed to describe the external shape of the object. The HOG within each bin can be computed with orientations in the range of [0, 360] and B=40 bins to quantize the gradient orientation. The PHOG descriptor F1 is a concatenation of the HOG computed within each bin at each resolution, which is of dimension G×B=840.

In addition, other silhouette attributes may be determined that are more global (536). Global features are related to the overall shape of the object or a specific configuration of the local shapes. Therefore, Global Object Shape Feature F2 can be extracted by computing PHOG descriptor at the object's whole contour points. Similar parameters are used for computing F2 so its dimension is also 840. F1 and F2 are partially overlapping but capture discriminative shape information at different resolutions.

Additionally, embodiments recognize that some silhouettes are better described by features inside the contours of the clothing/model (538). To describe internal shape features, a visual codebook histogram may be used. First, local features are sampled at multiple scales within the region of interest. Any shape-based image features can be used. The local features are computed around Harris corner points that are frequently correlated to silhouette attributes. Then, the local features can be clustered and extracted from training images using k-means (with k=1000) to generate the visual codebook. Additionally, for a new image, its local features are extracted similarly and then used to generate the Internal Shape Feature F3 based on the codebook with Spatial Pyramid Matching technique. More specifically, the local features can be mapped to the closest codewords in the visual codebook and then the number of mapped descriptors in each grid cell at each pyramid resolution level is recorded. One implementation utilizes a two-level pyramid with G=5 grid cells. The total dimension of internal shape feature F3 is k×G=5000. For some categories, specific features F4 can be developed, such as skin area for neckline recognition. The shape features F1, F2, F3 and specific features F4, if any, are concatenated to form the feature F for each image.

The features extracted from an object portion of an image content item can be used to determine the silhouette attribute for the object (540). In one embodiment, the silhouette features identified from performing a process such as described can be associated with a silhouette attribute using a training set of silhouettes and silhouette attributes. In particular, the training set may be developed on which classifiers are learned to automatically recognize the silhouette attribute of new images. The use of training sets may include SVM as the classifier due to its recognized ability and efficiency. The SVM classifier can output predictions with real valued confidences that are used to combine the text classifiers with other silhouette recognition algorithms.

A process performed by an embodiment of FIG. 5 may be either determinative of the silhouette attribute, or indicative of the silhouette attribute. In the latter case, the outcome of performing image analysis on the content item may include weighting the result with one or more other processes described herein, including text processes such as described above.

Examples

Figure 6A:
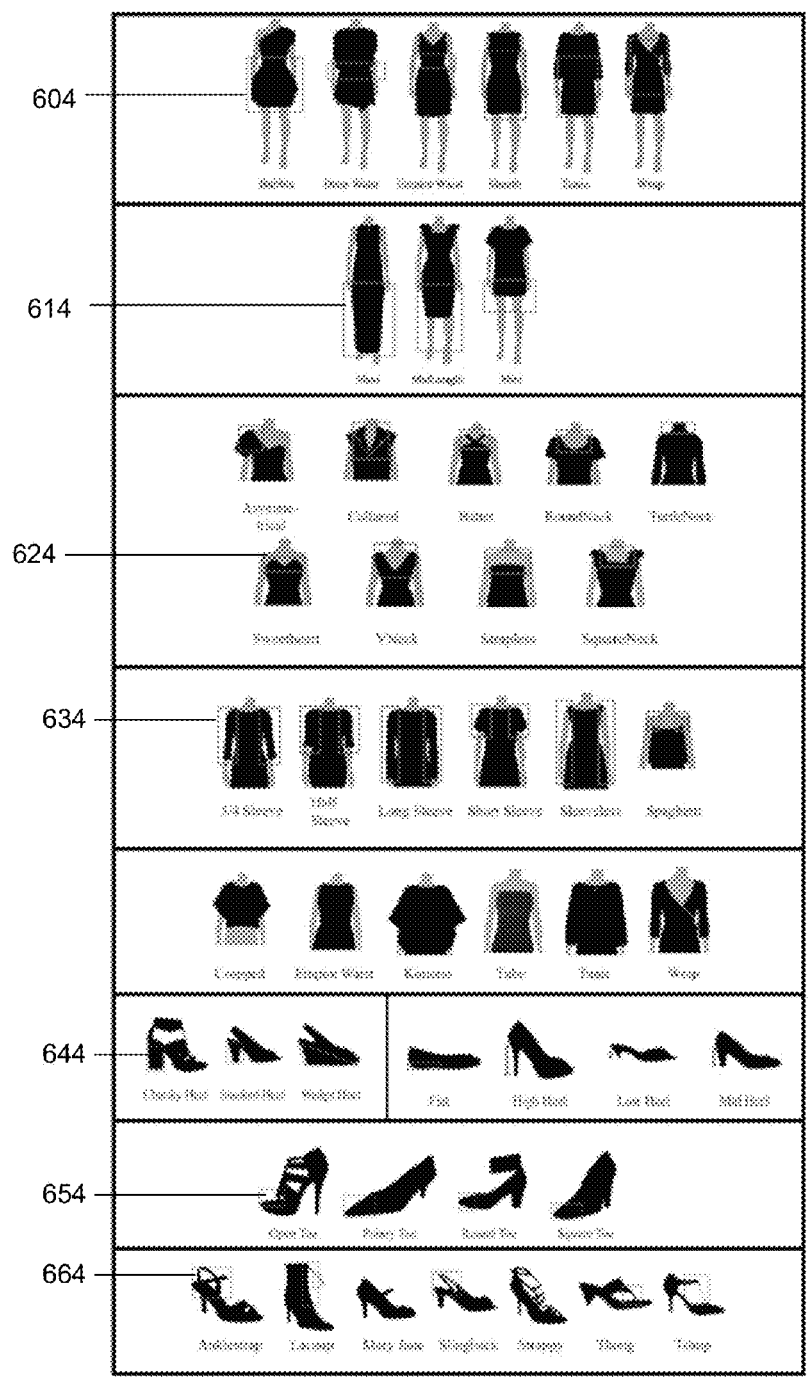
FIG. 6A through FIG. 6C illustrate image content items for which discriminative silhouette attributes of clothing and apparel are identified, in accordance with embodiments described herein.
Figure 6B:
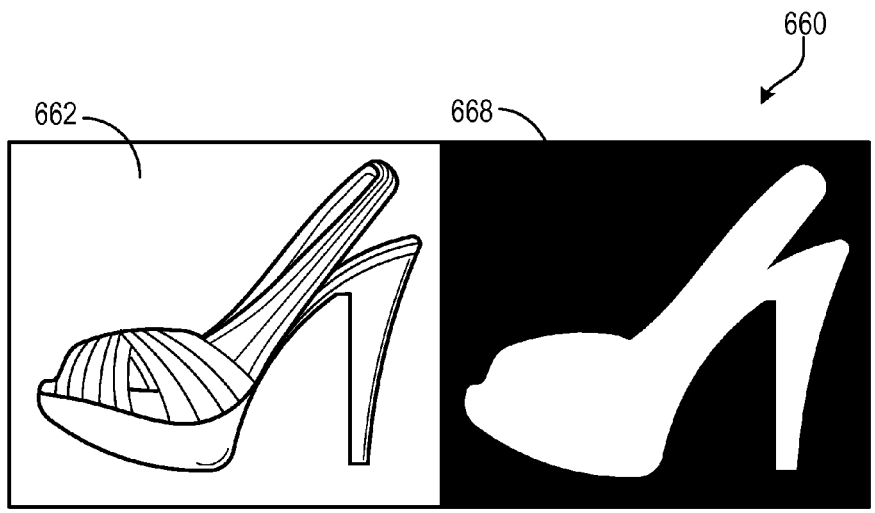
Figure 6C:
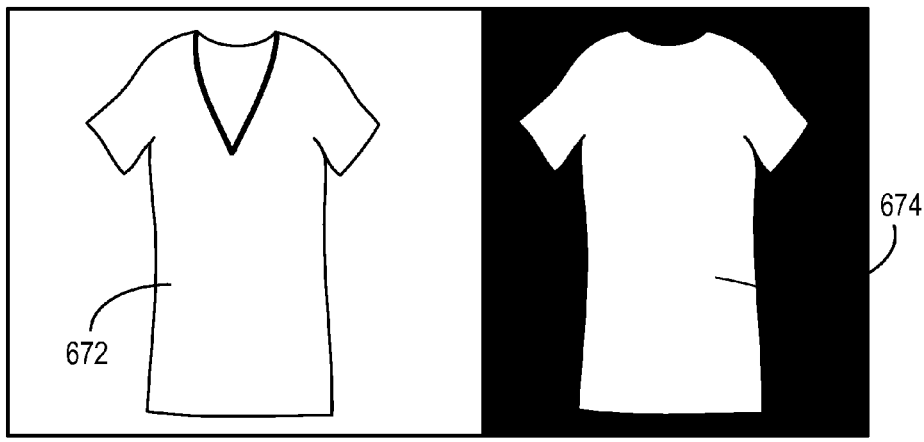

FIG. 6A through FIG. 6C illustrate image content items for which discriminative silhouette attributes of clothing and apparel are identified, in accordance with embodiments described herein. While examples illustrated with FIG. 6A through FIG. 6C are specific to dresses and shoes for women, other types of objects may be analyzed for silhouette attributes in a manner provided by embodiments described herein. For example, other classes of clothing/apparel may be analyzed for discriminative silhouette attributes, as described herein, e.g., men's clothing, men's shoes, purses, belts, hats.

FIG. 6A illustrates objects depicted in various image content items relating to clothing or apparel for women. For objects that are in the class of women's dresses, discriminative silhouette attributes can be determined at least in part from image processing. The individual subcategories of the class can be associated with the discriminative silhouette attributes. Each silhouette attribute may be discriminative to the subcategory of the object, which can be defined by the silhouette attribute. For example, in FIG. 6A, the class of objects may correspond to dresses, including the category of dresses that are distinctive by regions that include the midregion. Dresses include, by sub-category, bubble dresses, drop waist, empire waist, sheath, tunic and wrap labels are examples of subcategories of women's dresses. Each of the subcategories includes a discriminative silhouette attribute 604, corresponding to shape feature that is present at the dress' mid-region that is not shared by other subcategories in the class.

Similarly, dresses identified by silhouette attributes 614 at their respective bottom portions are identified as maxi, max-ilength, and mini dresses. The discriminative silhouette attribute identifies such dresses by the shape feature of the dress at its bottom trim line.

Dresses identified by discriminative silhouette attributes 624 at their respective top/strap portions are identified as, for example, asymmetrical, collared, halter, roundneck, turtleneck, sweetheart, V-neck, strapless and squareneck. Dresses identified by silhouette attributes 634 at their respective top/sleeve portions are identified as, for example, ¾ sleeve, half-sleeve, long sleeve, short sleeve, sleeveless and spaghetti.

The product class of women's shoes can include sub-categories that include silhouette attributes 644 that identify the shoes by, for example, the bottom heal portions. Shoes identified by silhouette attributes 644 at their respective bottom heel portions are identified as, for example, chunky heel, stacked heel, wedge heel, flat, high heel, low heel, and mild heel. Shoes identified by silhouette attributes 654 at their respective toe portions are identified as, for example, open toe, pointy toe, round toe, and square toe type. Shoes identified by silhouette attributes 664 corresponding to straps at their top portions are identified as, for example, anklestrap, laceup, slingback, strappy, thong and Tstrap.

Still further, as shown by the example of FIG. 6A, some embodiments recognize that some sub-categories of objects do not have a silhouette attribute, at least one that can be reliably identified from analyzing image content items. Such sub-categories may be identified by, for example, accompanying text or through image processing that does not utilize silhouette attributes. For example, some shoes, like Mary Jane or strappy types may not be identifiable visually by a discriminative silhouette attribute.

The examples provided by FIG. 6A illustrate use of discriminative silhouette attributes, which can optionally categorize objects into one or more categories within the class. Some objects can be associated with more than one sub-category, and accordingly include more than one discriminative silhouette attribute. For example, a shoe may include a discriminative silhouette attribute corresponding to a toe or bottom heel region. A dress may include a discriminative silhouette attribute at its top region and its bottom trim line.

FIG. 6B illustrates an image content item 660 that includes an image portion 662 and a text portion 664. A silhouette image 668 is shown with the image content item. The image portion 662 can be subjected to image analysis to identify discriminative silhouette attributes, e.g., heel portion. The image portion 662, however, may be partially occluded. Text analysis, as provided with embodiments described above, may be utilized to identify other silhouette attributes of the depicted object. In the example shown, the shoe can be identified as having an open toe from the text, as the image portion 662 lacks the pose to enable that feature's identification.

FIG. 6C illustrates an image of an object that may require text for purpose of determining the object's silhouette attribute at the top neckline. In the specific example, the image 672 is of a V-neck t-shirt, but the silhouette image 674 cannot distinguish the presence of the V-neck from the text. For such silhouette attributes, the text may be required to identify, or or alternatively verify, the presence of the silhouette attribute.

The Table 1, see below, provides examples of products, such as clothing and apparel, of different types, listing silhouette attributes as determined by processes described with embodiments herein. As shown, silhouette attributes for some products may be determined using only text based algorithms, others may be determined using only image analysis algorithms, and silhouette attributes of many other products are determined using the combination of text and visual algorithms.

| Cat. | Alg. | Attributes |
|---|---|---|
| Dresses Bodice (10,843) | Text& Visual + Text Classifier | Bubble (716) Drop Waist (503) Empire Waist (3,902) Sheath (3,647) Tunic (1,299) Wrap (875) |
| Dresses-Length (18,855) | Text Classifier | Maxi (2,644) MidLength (3,608) Mini (12,603) |
| Dresses &Tops. Neck-Line (21,544) | Text& Visual + Text Classifier + Visual Classifier | Asymmetric (830 Collared (1,075) Halter (1,340) RoundNeck (7,914) TurtleNeck (442) Sweetheart (419) VNeck (4,295) Strapless (4,471) SquareNeck (758) |
| Dresses &Tops. Sleeve (22,491) | Text& Visual + Text Classifier | ¾ Sleeve (942) Half Sleeve (694) Long Sleeve (4,908) Short Sleeve (5,731) Sleeveless (9,178) Spaghetti (1,038) |
| Tops. Bodice (2,914) | Text& Visual | Cropped (115) Empire Waist (512) Kimono (63) Tube (94) Tunic (2,069) Wrap (61) |
| Shoes. Heel (4,835) | Text Classifier | Chunky Heel (1,003) Stacked Heel (453) Wedge Heel (3,379) |
| Shoes. Height (19,534) | Visual Classifier | Flat (11,733) High Heel (5,484) Low Heel (1,505) Mid Heel (812) |
| Shoes. Toe (4,114) | Text Classifier + Visual Classifier | Open Toe (697) Pointy Toe (1,403) Round Toe (1,667) Square Toe (347) |
| Shoes. Upper (6,372) | Visual Classifier | Anklestrap (691) Laceup (687) Mary Jane (265) Slingback (1,930) Strappy (653) Thong (1,748) Tstrap (398) |

Figure 7:
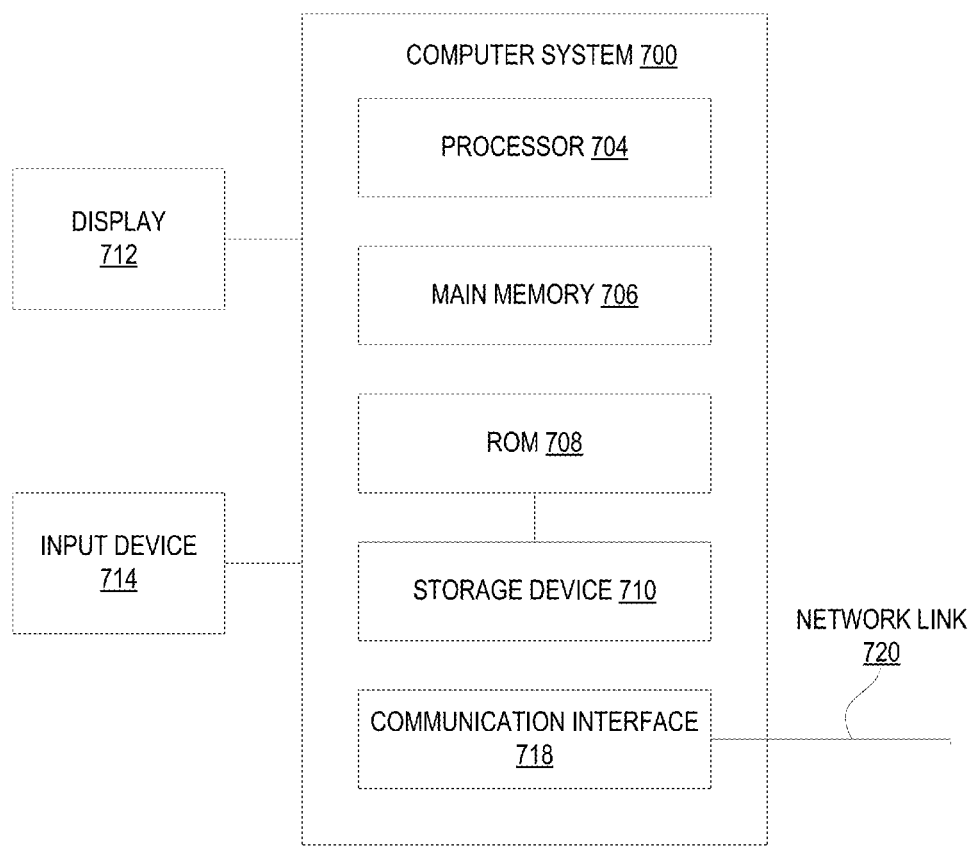
FIG. 7 is a block diagram that illustrates a computer system upon which embodiments described herein may be implemented.

FIG. 7 is a block diagram that illustrates a computer system upon which embodiments described herein may be implemented. For example, a system such as described by FIG. 2 may be implemented using a computer system such as described by FIG. 7.

In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) 708 or other static storage device for storing static information and instructions for processor 704. A storage device 710, such as a magnetic disk or optical disk, is provided for storing information and instructions. The communication interface 718 may enable the computer system 700 to communicate with one or more networks through use of the network link 720.

Computer system 700 can include display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments may include any number of input devices 714 coupled to computer system 700.

Embodiments described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments described herein. Thus, embodiments described are not limited to any specific combination of hardware circuitry and software.

Conclusion

Although illustrative embodiments have been described in detail herein with reference to the accompanying drawings, it is to be understood that the embodiments described are not limited to specific examples recited. As such, many modifications and variations are possible, including the matching of features described with one embodiment to another embodiment that makes no reference to such feature. Moreover, a particular feature described either individually or as part of an embodiment can be combined with other individually described features, or parts of other embodiments, even if the other features and embodiments make no mention of the particular feature.

What is claimed is:

1. A method for analyzing image content items, the method being implemented by one or more processors and comprising:
   determining a set of silhouette attributes for a class of objects, each silhouette attribute corresponding to a discriminative feature that is not provided by any other silhouette attribute in the set;
   analyzing an image content item depicting an object of the class of objects, including performing text analysis on a text portion of the image content item, including:
      associating each of a set of words with a corresponding silhouette attribute;
      identifying one of the set of words in the text portion of the image content item; and
      identifying the silhouette attribute corresponding to the identified one of the set of words;
   determining that the object has the discriminative feature that corresponds to one of the silhouette attributes of the set; and
   associating the one of the silhouette attribute in the set with the object depicted in the image content item.

2. The method of claim 1, wherein determining the set of silhouette attributes for the class of objects includes determining a set of silhouette attributes for a class of clothing or apparel.

3. The method of claim 2, wherein the class of clothing or apparel includes one of women's dresses, women's shoes, or men's shoes.

4. The method of claim 2, further comprising determining a style of an item of clothing or apparel based on the associated silhouette attribute.

5. The method of claim 2, further comprising determining a subcategory of an item of clothing or apparel based on the associated silhouette attribute.

6. The method of claim 1, wherein analyzing the image content item includes performing image analysis on an image portion of the image content item.

7. The method of claim 1, wherein analyzing the image content item includes performing image and text analysis on the image content item.

8. The method of claim 1, wherein performing the text analysis includes:
   identifying a text classifier in the text portion of the image content item; and
   determining a probability of the text classifier being an identifier for one or more silhouette attributes.

9. The method of claim 1, further comprising categorizing the object based on the associated silhouette attribute.

10. A system for analyzing image content items, the system comprising:
    one or more processors; and
    a memory coupled to the one or more processors, wherein the memory stores instructions that, when executed by the one or more processors, cause the one or more processors to:
       determine a set of silhouette attributes for a class of objects, each silhouette attribute corresponding to a discriminative feature that is not provided by any other silhouette attribute in the set;
       analyze an image content item depicting an object of the class, including performing text analysis on a text portion of the image content item, including:
          associating each of a set of words with a corresponding silhouette attribute;
          identifying one of the set of words in the text portion of the image content item; and
          identifying the silhouette attribute corresponding to the identified one of the set of words;
       determine that the object has the discriminative feature that corresponds to one of the silhouette attributes of the set;
       associate the one of the silhouette attribute in the set with the object depicted in the image content item.

11. The system of claim 10, wherein the memory stores instructions that cause the one or more processors to determine the set of silhouette attributes for the class of objects by determining a set of silhouette attributes for a class of clothing or apparel.

12. The system of claim 11, wherein the class of clothing or apparel includes one of women's dresses, women's shoes, or men's shoes.

13. The system of claim 11, wherein the memory stores instructions that cause the one or more processors to determine a style of an item of clothing or apparel based on the associated silhouette attribute.

14. The system of claim 11, wherein the memory stores instructions that cause the one or more processors to determine a sub-category of an item of clothing or apparel based on the associated silhouette attribute.

15. The system of claim 10, wherein the memory stores instructions that cause the one or more processors to analyze the image content item by performing image analysis on an image portion of the image content item.

16. The system of claim 10, wherein the memory stores instructions that cause the one or more processors to analyze the image content item by performing image and text analysis on the image content item.

17. The system of claim 10, wherein the memory stores instructions that cause the one or more processors to:
    identify a text classifier in the text portion of the image content item; and
    determine a probability of the text classifier being an identifier for one or more silhouette attributes.

18. The system of claim 10, wherein the memory stores instructions that cause the one or more processors to categorize the object based on the associated silhouette attribute.

19. A non-transitory computer-readable medium that stores instructions, including instructions which when executed by one or more processors, cause the one or more processors to perform operations comprising:
    determining a set of silhouette attributes for a class of objects, each silhouette attribute corresponding to a discriminative feature that is not provided by any other silhouette attribute in the set;
    analyzing an image content item depicting an object of the class of objects, including performing text analysis on a text portion of the image content item, including:
       associating each of a set of words with a corresponding silhouette attribute;
       identifying one of the set of words in the text portion of the image content item; and
       identifying the silhouette attribute corresponding to the identified one of the set of words;

determining that the object has the discriminative feature that corresponds to one of the silhouette attributes of the set; and associating the one of the silhouette attribute in the set with the object depicted in the image content item.

* * * * *